(12) United States Patent
Min

(10) Patent No.: US 7,224,955 B2
(45) Date of Patent: May 29, 2007

(54) APPARATUS AND METHOD FOR SENDING EMERGENCY RESCUE SIGNAL USING MOBILE COMMUNICATION TERMINAL

(75) Inventor: Kyung-Moo Min, Seoul (KR)

(73) Assignee: LG Electronics, Inc., Seoul (KR)

( * ) Notice: Subject to any disclaimer, the term of this patent is extended or adjusted under 35 U.S.C. 154(b) by 844 days.

(21) Appl. No.: 10/145,271

(22) Filed: May 14, 2002

(65) Prior Publication Data

US 2002/0173328 A1    Nov. 21, 2002

(30) Foreign Application Priority Data

May 18, 2001   (KR)   ................................ 2001-27334
May 18, 2001   (KR)   ................................ 2001-27335

(51) Int. Cl.
H04M 11/04   (2006.01)
(52) U.S. Cl. ................................ 455/404.1; 455/404.2; 455/521
(58) Field of Classification Search ............ 455/401.1, 455/401.2, 521, 466, 404.2
See application file for complete search history.

(56) References Cited

U.S. PATENT DOCUMENTS

| | | | | |
|---|---|---|---|---|
| 5,515,419 A | * | 5/1996 | Sheffer | 455/456.5 |
| 5,521,582 A | * | 5/1996 | Kingston | 340/539.11 |
| 5,790,961 A | * | 8/1998 | Ingram et al. | 455/574 |
| 6,226,510 B1 | * | 5/2001 | Boling et al. | 455/404.2 |
| 2001/0053699 A1 | * | 12/2001 | McCrady et al. | 455/513 |

FOREIGN PATENT DOCUMENTS

| | | | |
|---|---|---|---|
| CN | 1229926 | | 9/1999 |
| CN | 1250922 | | 4/2000 |
| GB | 2260009 A | | 3/1993 |
| JP | 362082726 A | * | 4/1987 |

* cited by examiner

Primary Examiner—Lana Le
Assistant Examiner—Angelica M. Perez
(74) Attorney, Agent, or Firm—Lee, Hong, Degerman, Kang & Schmadeka

(57) ABSTRACT

An apparatus and method for sending an emergent rescue signal using a mobile communication terminal can perform its operation as follows. A rescue requester requests emergent rescue using a mobile communication terminal and an emergent rescue center which received the emergent rescue-requesting checks an approximate position of the rescue requester, and dispatches an emergent rescuer to the position. The emergent rescuer who arrived the approximate position of the rescue requester sends a remote control signal to the mobile communication terminal of the rescue requester so that the mobile communication terminal can send an emergent rescue signal. Then, the mobile communication terminal sends the emergent rescue signal according to the received remote control signal so that the emergent rescuer can rapidly detect an exact location of the rescue requester.

2 Claims, 3 Drawing Sheets

APPARATUS AND METHOD FOR SENDING EMERGENCY RESCUE SIGNAL USING MOBILE COMMUNICATION TERMINAL

BACKGROUND OF THE INVENTION

1. Field of the Invention

The present invention relates to a mobile communication system, and particularly, to an apparatus and method for sending an emergency rescue signal using a mobile communication terminal.

2. Description of the Background Art

Generally, there are various methods for estimating a position of a terminal in a mobile communication system. Among those methods, a method which can be applied to a cellular system based on CDMA (Code Division Multiple Access) can be classified into a method which needs to modify a terminal and a method which does not need to modify a terminal.

First, a representative method in the above method which needs to modify the terminal is a plotting method based on a terminal, and this method requires a GPS (Global Positioning System) receiver to be installed in a mobile communication terminal carried by a user.

In case a user of the terminal is under an emergency condition, when the GPS receiver is operated by pushing a predetermined button (for instance, a rescue requesting button) on the mobile communication terminal in order to transmit position information of the mobile communication terminal, the GPS receiver installed in the mobile communication terminal receives a signal from three or more GPS satellites (four or more satellites, in case of estimating a position on a three dimension) to calculate distances between the mobile communication terminal and respective satellites and estimates the position of the mobile communication terminal using additional information received from the GPS satellite.

After that, the calculated position is automatically transmitted to a position that needs the position information of the user using the CDMA cellular network.

On the other hand, there are many methods which do not need to modify the terminal and a TOA (Time of Arrival) method using arrival time, an AOA (Angle of Arrival) method using arrival angles and a TDOA (Time Difference of Arrival) method using arrival time differences are commonly used.

First, with the TOA method using arrival time, a plurality of base stations around a mobile communication terminal receive a signal transmitted from the mobile communication terminal, and then, the respective base station measures the arrival time of the transmitted signal to calculate distances between the mobile communication terminal and the base station. And a virtual circle is made centering around the base station as making the distances as the radiuses, and then, a position where the circles are crossed to each other are estimated as the position of the mobile communication terminal.

Then, with the AOA method using an arrival angle, a plurality of base stations around a mobile communication terminal receive a signal transmitted from the mobile communication terminal, and the respective base station measures the direction of the transmitted signal. In addition, a virtual line toward the above direction is drawn, and a position where the lines are crossed with each other is estimated as the position of the mobile communication terminal.

With the TDOA method using arrival time difference, a plurality of base stations around a mobile communication terminal receive a signal transmitted from the mobile communication terminal. In addition, a hyperbolic curve is drawn using the arrival time differences of the signal transmitted to the respective base stations and a position where the hyperbolic curves are crossed to each other is estimated as the position of the mobile communication terminal.

However, according to the position estimating method using the GPS, the GPS receiver should be installed in the terminal additionally, a size and a weight of the terminal are increased. In addition, the GPS receiver also uses the power of a battery for the terminal, the power consumption of the terminal is increased.

Also, with the position estimating method using the GPS, the signal transmitted from the GPS satellite is very weakened when the signal is arrived at the terminal on the earth, and therefore it is difficult to receive the GPS signal in case that there are obstacles between the terminal and the GPS satellite such as in an urban area or indoor, whereby the function is lowered.

On the other hand, the TOA method using the arrival time and the TDOA method using the arrival time difference should use at least three base stations around the mobile communication terminal, and the AOA method using the arrival angle should also use at least two base stations. However, if the user is in a suburban area, there is little chance that there are two or three base stations around the user. Therefore, the signal from the mobile communication terminal is difficult to reach the other base stations, and even if the signal arrives at the other base stations, the signal is very weak and there may be a lot of error. Therefore, it is difficult to estimate the position of the mobile communication terminal.

As described above, it is difficult to estimate the position of the mobile communication terminal using only one estimating method using such the arrival time, arrival angle, or arrival time difference of signal in the suburban area.

Also, with the above conventional method, a position can be estimated approximately, but much time is required to estimate the position exactly. Accordingly, a new method for detecting an exact position of a rescue requester is required, under the condition that rapid and exact position detection is required, as in the emergency rescue.

SUMMARY OF THE INVENTION

Therefore, the present invention provides an apparatus and method for sending an emergency rescue signal using a mobile communication terminal, capable of rapidly detecting the exact position of a rescue requester in case of requesting emergency rescue.

Another object of the present invention is to provide an apparatus and method for sending an emergency rescue-requesting signal using a mobile communication terminal, capable of rapidly detecting the exact position of a rescue requester, by remote controlling the mobile communication terminal by the emergency rescuer so that the mobile communication terminal sends an emergency rescue-requesting signal, in case of requesting emergency rescue.

Still another object of the present invention is to provide an apparatus and method for sending an emergency rescue signal using a mobile communication terminal, capable of rapidly detecting the exact position of a rescue requester, by remote controlling the mobile communication terminal by the emergency rescuer so that the mobile communication terminal sends an ultrasonic signal, in case of requesting emergency rescue.

Still another object of the present invention is to provide an apparatus and method for sending an emergency rescue signal using a mobile communication terminal, capable of rapidly detecting the exact position of a rescue requester, by remote controlling the mobile communication terminal by the emergency rescuer so that the mobile communication terminal blinks a flash, in case of requesting emergency rescue.

To achieve these and other advantages and in accordance with the purpose of the present invention, as embodied and broadly described herein, there is provided an apparatus for sending an emergency rescue signal using the mobile communication terminal, including a keypad having a rescue requesting button, a modem unit for requesting emergency rescue according to adjustment of the rescue requesting button and controlling sending of an emergency rescue signal according to a remote control signal received from an emergency rescuer and an emergency rescue signal sending unit for sending the emergency rescue signal for detecting an exact position of a rescue requester according to control of the modem unit.

To achieve these and other advantages and in accordance with the purpose of the present invention, as embodied and broadly described herein, there is provided the apparatus for sending an emergency rescue signal using the mobile communication terminal, including a keypad for inputting a rescue requesting from a rescue requester, a modem unit for requesting emergency rescue according to the input of the rescue requesting and controlling sending of an ultrasonic signal according to a remote control signal received from an emergency rescuer, an ultrasonic wave module for generating an ultrasonic signal to detect an exact position of the rescue requester, according to controlling of the modem unit and a power supply unit for supplying a power to the ultrasonic wave module according to the controlling of the modem unit.

To achieve these and other advantages and in accordance with the purpose of the present invention, as embodied and broadly described herein, there is provided the apparatus for sending the emergency rescue signal using the mobile communication terminal, including a keypad for inputting a rescue requesting from a rescue requester, a modem unit for requesting emergency rescue to a base station according to the input of the rescue requesting and controlling sending of a flash blink signal according to a remote control signal received from an emergency rescuer, a power supply unit for supplying a power to the flash according to controlling of the modem unit, a blink control unit for blinking the flash by turning on or off the power source supplied to the power supply unit at a predetermined time interval and a charge detection unit for detecting a charge voltage of the blink control unit and controlling the blink control unit and modem unit according to the detection result.

To achieve these and other advantages and in accordance with the purpose of the present invention, as embodied and broadly described herein, there is provided a method for sending the emergency rescue signal using the mobile communication terminal, including the steps of receiving a remote control signal to control remotely sending of the emergency rescue signal in the mobile communication terminal from an emergency rescuer and sending the emergency rescue signal according to the remote control signal.

To achieve these and other advantages and in accordance with the purpose of the present invention, as embodied and broadly described herein, there is provided the method for sending the emergency rescue signal using the mobile communication terminal, including the steps of requesting emergency rescue using a mobile communication terminal from the rescue requester to an emergency rescue center, transmitting a password for controlling remotely sending of ultrasonic signal of the mobile communication terminal by an emergency rescuer dispatched from the emergency rescue center, checking whether the received password is identical with that of the mobile communication terminal when an emergency rescue-requesting signal is sent and sending an ultrasonic signal according to the received password when the received password is identical with the sent password.

To achieve these and other advantages and in accordance with the purpose of the present invention, as embodied and broadly described herein, there is provided the method for sending the emergency rescue signal using the mobile communication terminal, including the steps of requesting emergency rescue using a mobile communication terminal from a rescue requester to an emergency rescue center, transmitting a password for controlling remotely blinking of a flash of the mobile communication terminal by an emergency rescuer dispatched from the emergency rescue center, checking whether the received password is identical with that of the mobile communication terminal when an emergency rescue-requesting signal is sent, and blinking the flash for detecting an exact location of the rescue requester, when the received password and the sent password are identical.

The foregoing and other, features, aspects and advantages of the present invention will become more apparent from the following detailed description when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
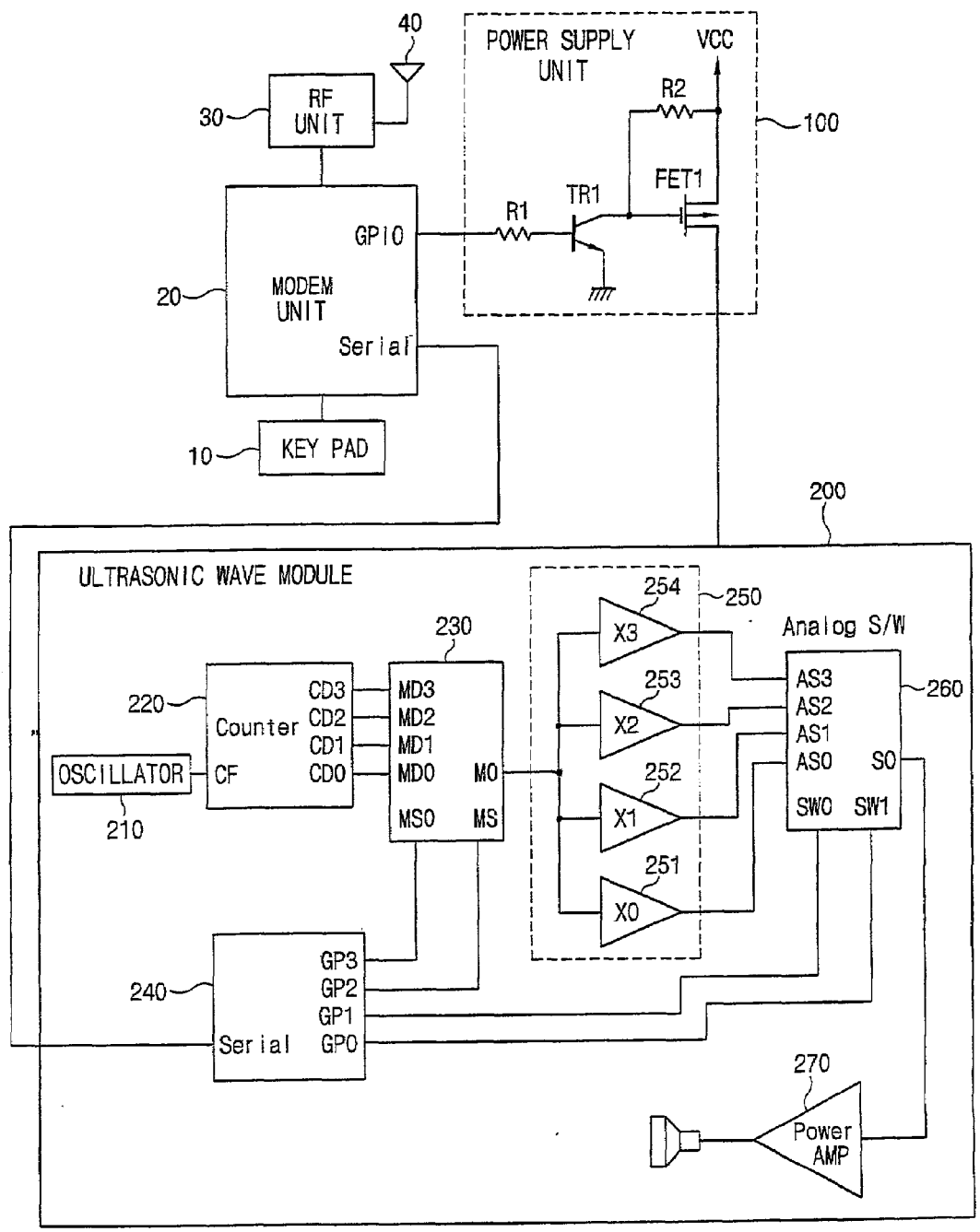
FIG. 1 is a view showing the apparatus for sending an emergency rescue signal which sends an ultrasonic signal.
Figure 3:
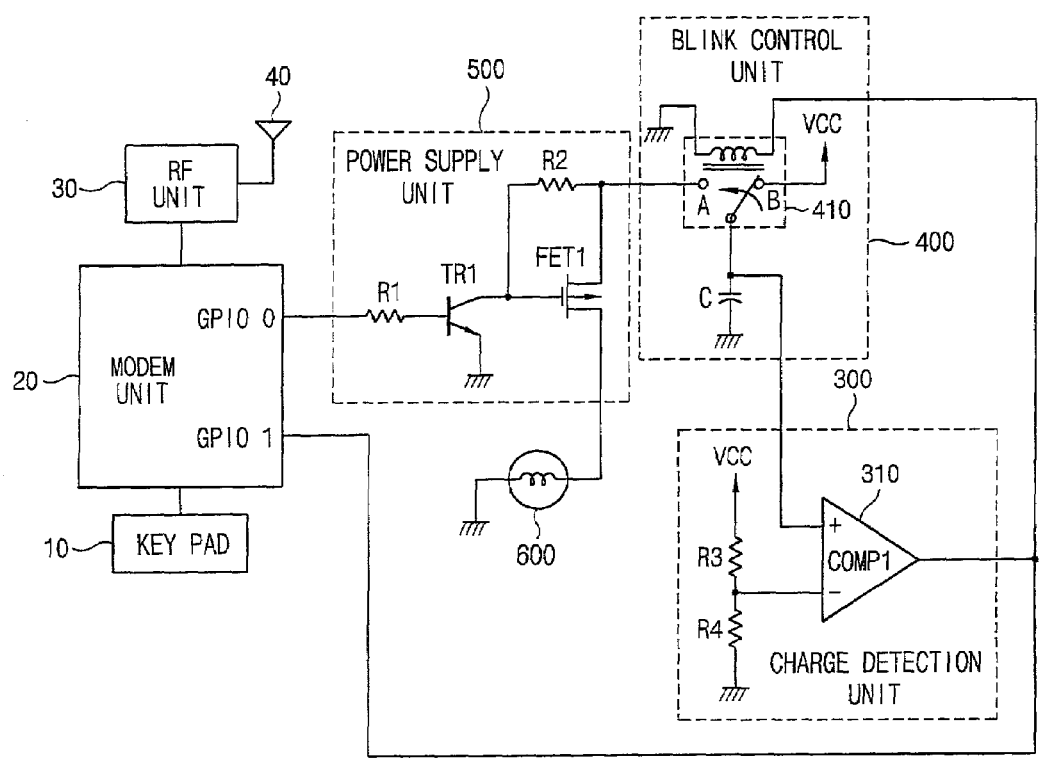
FIG. 3 is a view showing a composition of the apparatus for sending the emergency rescue signal which sends a flash blink signal in accordance with the present invention.

As shown in FIGS. 1 and 3, the apparatus for sending an emergency rescue signal using a mobile communication terminal in accordance with the present invention includes a keypad 10 having a rescue requesting button, a modem unit 20 for requesting emergency rescue according to adjustment of the rescue requesting button and controlling sending of the emergency rescue-requesting signal according to the remote control signal received from an emergency rescuer and emergency rescue signal sending units 100, 200, 300~600 for sending the emergency rescue signal for detecting an exact location of the rescue requester according to control of the modem unit 20.

The emergency rescue signal sending units 100, 200 send an ultrasonic signal and the emergency rescue signal sending units 300~600 send a flash blink signal (a flash on/off signal).

FIG. 1 is a view showing the apparatus for sending an emergency rescue signal which sends an ultrasonic signal.

As shown in FIG. 1, the apparatus for sending an emergency rescue signal which sends an ultrasonic signal includes a keypad 10 for receiving rescue requesting from a rescue requester, a modem unit 20 for requesting emergency rescue according to adjustment of the rescue requesting button and controlling sending of the ultrasonic signal according to the remote control signal received from an emergency rescuer, an ultrasonic wave module 200 for generating an ultrasonic signal for detecting the exact position of the rescue requester, according to controlling of the modem unit 20, and a power supply unit 100 for supplying a power source to the ultrasonic wave module 200 according to the controlling of the modem unit 20.

The keypad 10 has an rescue requesting button. The rescue requesting button can use a button between a conventional button additionally having a rescue requesting function and an additional button of the rescue requesting function.

The power supply unit includes a transistor TR1 which is turned on or off, according to controlling of a global input/output port (GPIO) of the modem unit 20 and a PMOS transistor FET1 for supplying a power source to the ultrasonic wave module 200 according to the output voltage of the transistor TR1.

The ultrasonic wave module 200 includes an oscillator 210 for oscillating a signal of a predetermined frequency, a counter 220 for dividing the frequency signal oscillated from the oscillator into a predetermined number of different division ratios, a multiplexer 230 for multiplexing the predetermined number of counting signals outputted from the counter, a pre-amplifying unit 250 for amplifying the multiplexed signal using predetermined number of pre-amplifiers 251-254 having different amplifying gain, an analog switch 260 for selectively outputting a signal among the signals outputted from the pre-amplifying unit 250, a power amplifier 270 for outputting the signal outputted from the analog switch 260 by amplifying the power and a microcomputer 240 connected to a serial port of the modem unit 20, for controlling multiplexing of the counting signal according to controlling of the modem unit 20 and controlling the analog switch 260.

Figure 2:
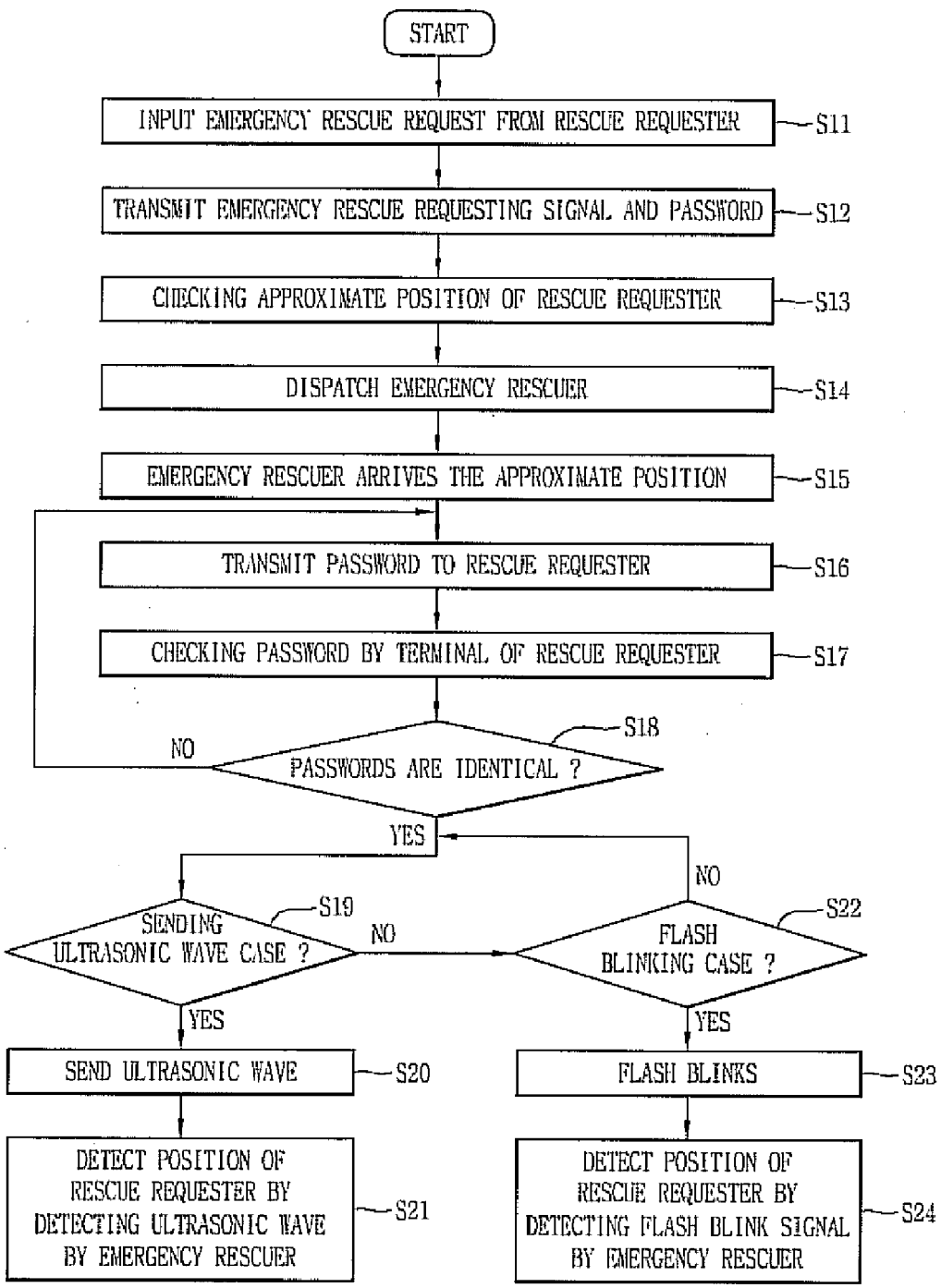
FIG. 2 is a flow chart illustrating a method for sending an emergency rescue signal using a mobile communication terminal in accordance with the present invention.

The operation of the apparatus for sending an emergency rescue signal in accordance with an embodiment of the present invention with the above composition will be described with reference to FIG. 2 as follows.

First, when the rescue requesting button of the mobile communication terminal is pushed by the rescue requester (S11), the modem unit 20 of the mobile communication terminal generates an emergency rescue-requesting signal and sends the signal to the base station through the RF unit 30. The signal includes a password for remote controlling sending of ultrasonic signal in the mobile communication terminal. The signal sent from the mobile communication terminal is sent to the emergency rescue center through the mobile communication system (S12).

The emergency rescue center which received the emergency rescue-requesting signal checks an approximate position of the rescue requester (S13), and dispatches an emergency rescuer to the position (S14). The estimation of the approximate position can be checked using the conventional art.

On the other hand, the emergency rescuer who arrived the approximate position of the rescue requester sends a remote control signal to the rescue requester. Namely, the emergency rescuer calls the rescue requester by telephone and sends a password received with the emergency rescue-requesting signal (S15, and S16).

When the password is received from the emergency rescue requester, the mobile communication terminal checks whether the received password and the password sent by the mobile communication terminal when the emergency rescue-requesting signal is sent are identical (S17).

When the received and sent passwords are identical (S18), the mobile communication terminal checks whether the sent signal is an ultrasonic signal or flash blink signal. In case of sending an ultrasonic signal, the modem unit 20 of the mobile communication terminal controls the power supply unit 100 and ultrasonic wave module 200 so that an ultrasonic signal is sent.

Then the power supply unit 100 supplies a power source to the ultrasonic wave module 200 and the ultrasonic wave module 200 sends an ultrasonic signal.

The operation of the power supply unit 100 and the ultrasonic wave module 200 will be described in detail.

First, the operation of the power supply unit 100 will be described. When a signal of low level is outputted from a GPIO of the modem 20, the transistor TRI is turned off and accordingly, a power voltage is applied to the gate of the PMOS transistor FET1 through the resistor R2. Therefore, the PMOS transistor is turned off and the power supply unit 100 can not supply the power to the ultrasonic wave module 200.

However, when a signal of high level is outputted from the GPIO of the modem unit 20, the transistor TRI is turned on and accordingly, a signal of low level is applied to the gate of the PMOS transistor FET1. Therefore, the PMOS transistor is turned on and the power supply unit 100 can supply the power to the ultrasonic wave module 200.

Then, the operation of the ultrasonic wave module 200 will be described. An oscillator 210 sends a signal of a predetermined frequency, a counter 220 divides the oscillated frequency signal into frequencies of one, half, one fourth and one eighth, and inputs the divided signals to the multiplexer 230. When an enable signal is outputted from a serial connection port of the modem unit 20, the microcomputer 240 selects a preferred frequency signal by controlling the multiplexer 230 and the multiplexer 230 outputs the selected frequency signal. The frequency signal outputted from the multiplexer 230 is amplified by four pre-amplifiers 251-254 having different amplifying gain in the pre-amplifying unit 250 and inputted to an analog switch 260.

The microcomputer 240 outputs an amplifying signal having a preferred amplifying gain among the inputted four amplifying signal by controlling the analog switch 260. When the amplifying signal having the preferred amplifying gain is outputted from the analog switch 260, the power amplifier 270 amplifies the power of the amplifying signal and outputs to the outside. By the above operation, the ultrasonic wave module 200 outputs the ultrasonic signal and the emergency rescuer who arrived the approximate position of the rescue requester detects the outputted ultrasonic signal, thus to exactly and swiftly detect the position of the rescue requester.

FIG. 3 is a view showing a composition of the apparatus for sending the emergency rescue signal which sends a flash blink signal in accordance with the present invention.

As shown in FIG. 3, the apparatus for sending the emergency rescue signal which sends a flash blink signal, includes a keypad 10 for inputting a rescue requesting from a rescue requester, a modem unit 20 for requesting emergency rescue to a base station according to input of the rescue request and controlling sending of the flash blink signal according to the remote control signal received from an emergency rescuer, a power supply unit 500 for supplying a power to a flash 600 according to controlling of the modem unit 20, a blink control unit 400 for blinking the flash by turning on or off the power source supplied to the power supply unit 500 at a predetermined time interval and a charge detection unit 300 for detecting charge voltage of the blink control unit 400 and controlling the blink control unit 400 and modem unit 20 according to the detection result.

The keypad 10 can be composed by additionally having a rescue requesting button or the rescue requesting function can be set using a conventional predetermined button.

The power supply unit 500 includes a transistor TR1 which is turned on or off, connected to a first global input/output port 0 (GPIO 0) of the modem unit 20, which is turned on or off according to controlling of the modem unit 20 and a PMOS transistor FET1 for supplying a power source to the flash 600 according to the output voltage of the transistor TR1.

The apparatus of claim 13, wherein the blink control unit includes a charge circuit having a capacitor C, and a relay 410 for charging and discharging the capacitor C being turned on or off according to controlling of the charge detection unit 300.

The relay 410 charges the capacitor C under the condition of being turned off and supplies the charged voltage in the capacitor C to the power supply unit 500 under the condition of being turned on.

The charge detection unit 300 includes a comparator 310 for comparing the charge voltage of the capacitor C of the blink control unit 400 inputted as the non-inversion pin+ and the reference voltage inputted as the inversion pin− and outputting a signal of high level to the blink control unit 400 and modem unit 20 when the charge voltage is higher than the reference voltage.

The operation of the apparatus for sending the emergency rescue signal which sends the flash blink signal in accordance with the other embodiment of the present invention will be described with reference to FIG. 2.

The description of the operation from S11 to S18 is identical as that of the operation of the apparatus for sending the emergency rescue signal which sends the ultrasonic signal and the description will be omitted.

After performing S18, the mobile communication terminal checks whether the ultrasonic signal is sent or a flash blink signal is sent. In case of sending the flash blink signal (S22), the modem unit 20 of the mobile communication terminal checks whether the flash 600 can emit light.

Namely, the relay 410 of the blink control unit 400 charges the power voltage VCC in the capacitor C under the condition of being turned off. The charge detection unit 300 compares the charge voltage of the capacitor C and the reference voltage and outputs a signal of high level to the relay unit 410 and modem unit 20 if the charge voltage is higher that the reference voltage.

The relay 410 is turned on by the signal of high level outputted from the charge detection unit 300 and converts the switch from the open point (B point) to the close point (A point). Therefore, the voltage charged in the capacitor C is applied to the power supply unit 500.

The modem unit 20 determines that the flash 600 can emit light by completing charging of the charge circuit in the blink control unit 400, according to the signal of high level outputted from the charge detection unit 300.

Therefore, the modem unit 20 outputs the signal of high level to the first GPIO 0 connected to the power supply unit 500.

Then, the transistor TR1 of the power supply unit 500 is turned on and the PMOS transistor FET1 is turned of according to the turn-on of the transistor TRI, thus to supply the voltage charged in the capacitor C of the blink control unit 400 to the flash 600. Therefore, the flash 600 emits light.

When the voltage charged in the capacitor C of the blink control unit 400 due to light emission of the flash 600, the relay 410 of the blink control unit 400 charges the capacitor C by converting the switch from the open point (B point) to the close point (A point). When the relay 410 converts the switch to the close point, the flash is turned off (S23). By the above method, the flash blink signal is sent from the mobile communication terminal and the emergency rescuer can detect an exact location of the rescue requester by detecting the flash blink signal (S24).

As described above, with the present invention, the emergency rescuer can rapidly detect the exact position of the rescue requester, by remote controlling the mobile communication terminal by the emergency rescuer so that the mobile communication terminal sends an ultrasonic signal, in case of requesting emergency rescue.

Also, with the present invention the emergency rescuer can rapidly detect the exact location of the rescue requester detecting the flash blink signal, by remote controlling of the mobile communication terminal by the emergency rescuer so that the mobile communication terminal blinks the flash, in case of requesting emergency rescue.

As the present invention may be embodied in several forms without o departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An apparatus for sending an emergency rescue signal using a mobile communication terminal, comprising:
   a keypad having a rescue requesting button;
   a modem unit for requesting emergency rescue by engaging the rescue requesting button and controlling transmission of an emergency rescue signal according to a remote control signal received from an emergency rescuer;
   an emergency rescue signal sending unit for sending the emergency rescue signal and for detecting an exact position of a rescue requester according to controlling of a modem unit;
   wherein the emergency rescue signal sending unit comprises an ultrasonic wave module for generating an ultrasonic signal for detecting the exact position of the rescue requested, according to controlling of the modem unit, and a power supply unit for supplying power to the ultrasonic wave module according to controlling of the modem unit;

wherein the ultrasonic wave module comprises:

an oscillator for oscillating a signal of a predetermined frequency;

a counter for dividing the frequency signal from the oscillator into a predetermined number of different division ratios;

a multiplexer for multiplexing a predetermined number of counting signals outputted from the counter;

a pre-amplifying unit for amplifying the multiplexed predetermined number of counting signals using a predetermined number of corresponding pre-amplifiers each having a different amplifying gain;

an analog switch for selectively outputting a signal among signals outputted from the pre-amplifying unit;

a power amplifier for amplifying the signal outputted from the analog switch, and outputting the power-amplified signal to a speaker; and a micro-computer for controlling multiplexing of the pre-determined number of counting signals and controlling the analog switch, according to controlling of the modem unit.

2. An apparatus for sending an emergency rescue signal using a mobile communication terminal, comprising:

a keypad for inputting rescue requesting from a rescue requester;

a modem unit for requesting emergency rescue according to the input of the rescue requesting and controlling transmission of an ultrasonic signal according to a remote control signal received from an emergency rescuer;

an ultrasonic wave module for generating an ultrasonic signal to detect an exact location of the rescue requester, according to controlling of the modem unit; and a power supply unit for supplying a power to the ultrasonic wave module according to the controlling of the modem unit, wherein the power supply unit comprises a transistor which is turned on or off, according to controlling of the modem unit; and a PMOS transistor for supplying a power to the ultrasonic wave module according to an output voltage of the transistor, and wherein the ultrasonic wave module comprises: an oscillator for oscillating a signal of a predetermined frequency;

a counter for dividing the frequency signal oscillated from the oscillator into a predetermined number of different division ratios;

a multiplexer for multiplexing the predetermined number of counting signals outputted from the counter;

a pre-amplifying unit for amplifying the multiplexed signal using the predetermined number of pre-amplifier having different amplifying gain;

an analog switch for selectively outputting a signal among the signals outputted from the pre-amplifying unit;

a power amplifier for amplifying the power of the signal outputted from the analog switch, and outputting the power-amplified signal to a speaker; and a micro-computer for controlling multiplexing of the counting signal and controlling the analog switch, according to controlling of the modem unit.

* * * * *